United States Patent
Clarkson

[11] Patent Number: 6,122,991
[45] Date of Patent: Sep. 26, 2000

[54] HANDLEBAR ASSEMBLY FOR VEHICLES AND METHOD FOR MAKING THE SAME

[76] Inventor: Douglas Dean Clarkson, 1407 Bonita Ct., Upland, Calif. 91786

[21] Appl. No.: 09/246,016

[22] Filed: Feb. 5, 1999

Related U.S. Application Data

[60] Provisional application No. 60/074,198, Feb. 10, 1998.

[51] Int. Cl.$^7$ ................................................ B62K 21/18
[52] U.S. Cl. ........................................ 74/551.8; 74/551.1
[58] Field of Search ................................ 74/492, 551.1, 74/551.8; 280/279, 280; 29/525.11, 469; 403/391, 399

[56] References Cited

U.S. PATENT DOCUMENTS

| | | | |
|---|---|---|---|
| 610,328 | 9/1898 | Martin | 74/551.8 |
| 822,487 | 6/1906 | Smith | 74/551.8 |
| 2,216,833 | 10/1940 | Barry | 74/551.8 |
| 3,333,862 | 8/1967 | Rockwell | 280/279 |
| 3,655,219 | 4/1972 | Jacoby | 280/279 |
| 4,347,893 | 9/1982 | Moyer | 74/551.8 |
| 4,621,805 | 11/1986 | Chen | 74/551.1 |

*Primary Examiner*—David A. Bucci
*Assistant Examiner*—Chong H. Kim
*Attorney, Agent, or Firm*—John E. Wagner; Robert C. Smith

[57] ABSTRACT

A handlebar assembly and method of making same includes cutting a straight handlebar tube to a desired length, forming a reinforcing member or slug to fit within the tube including drilling and tapping radial bores and forming a longitudinal groove in the slug for the passage of control wires etc. Somewhat larger diameter bores are formed near the center of the handlebar tube in registry with the bores in the slug. The slug is then fixed in the tube in the desired position after which the tube is bent to the desired configuration and handgrip sections are formed. The handlebar is then finished as by chrome plating. A mount is formed having bores spaced like those of the slug and a longitudinal groove to support the center section of the handlebar. The mount is then finished as desired. Threaded fastening members are then passed through the bores in the mount and the handlebar and are screwed into the threaded bores in the slug to secure the assembly together. The larger diameter bores in the handlebar tube permit angular adjustment of the handlebars. The slug may also be a tubular member or a semi-cylindrical member which accommodates the wires without requiring a longitudinal groove.

19 Claims, 5 Drawing Sheets

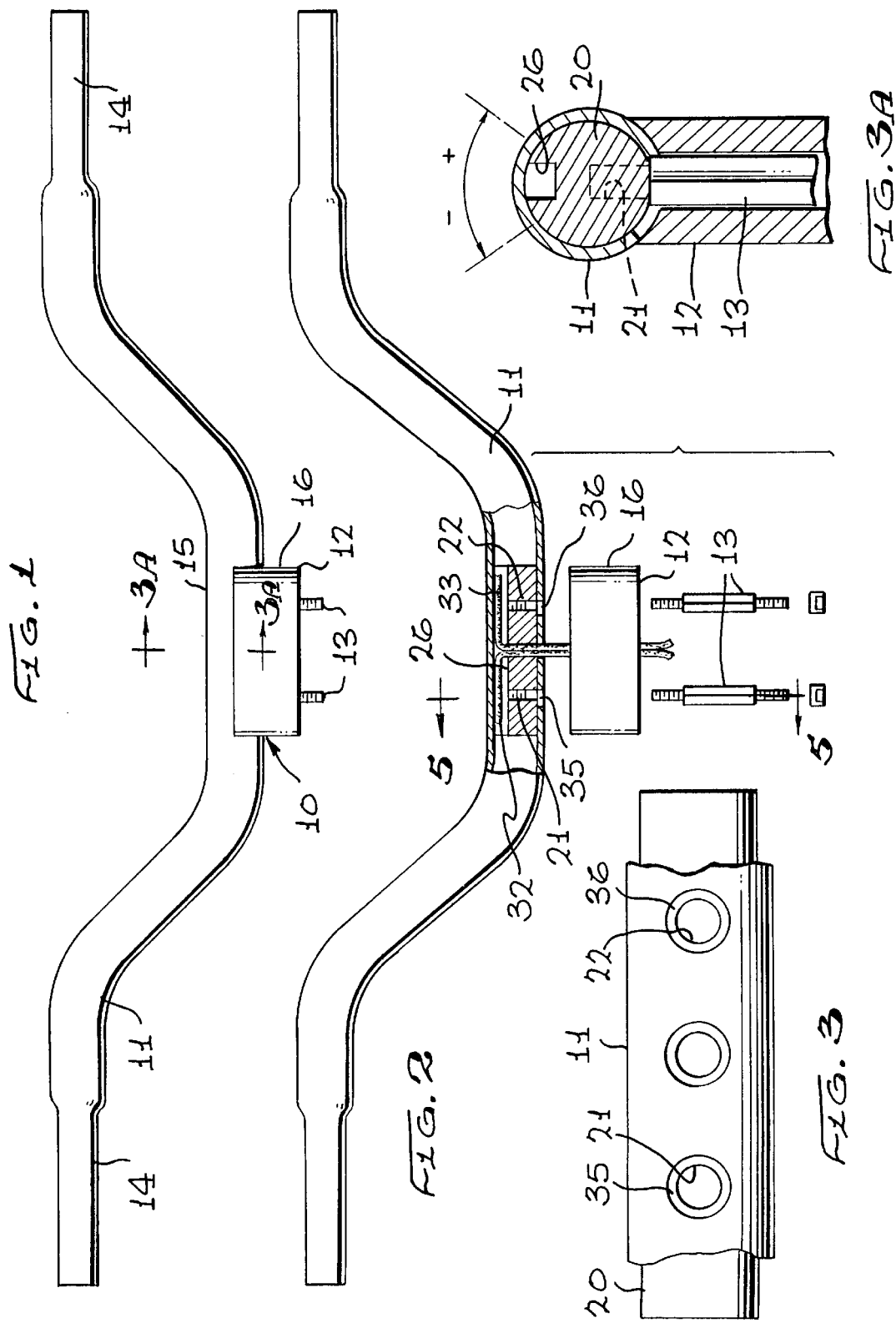

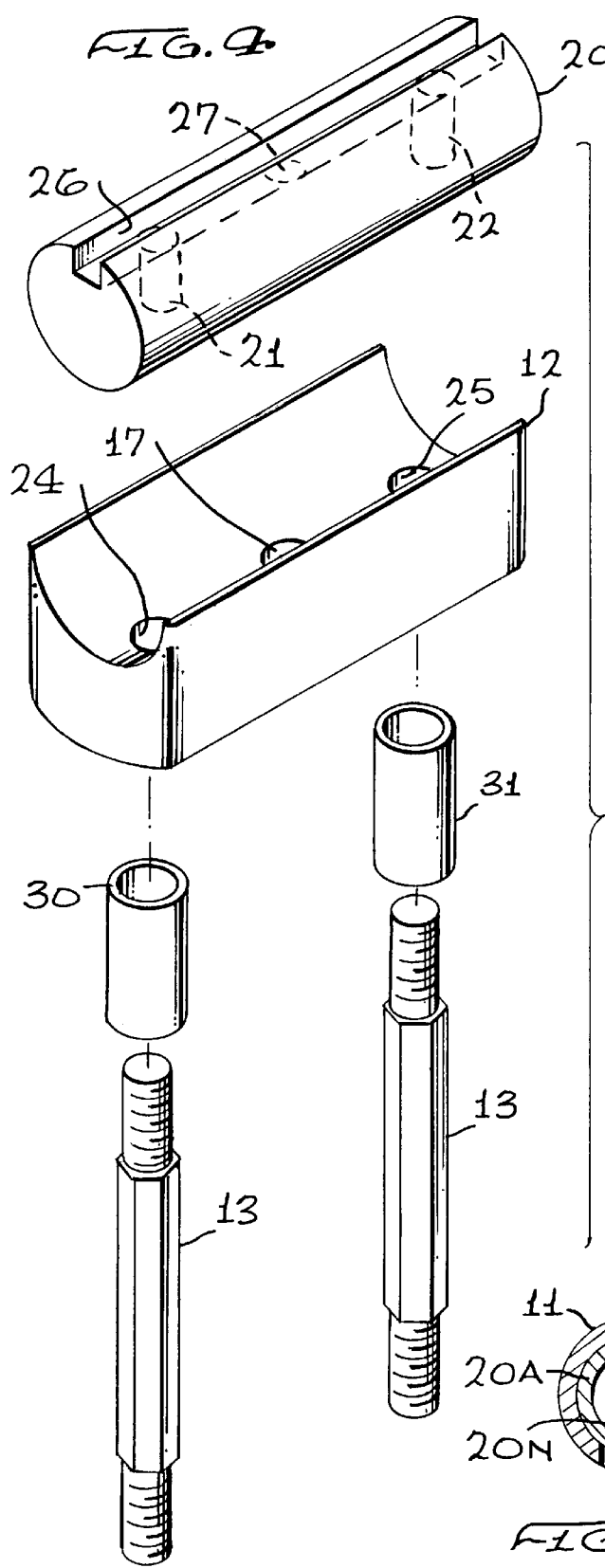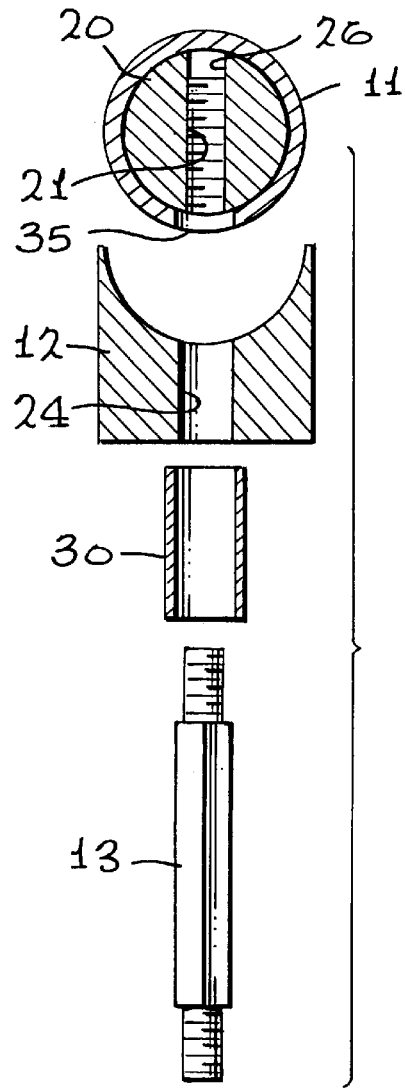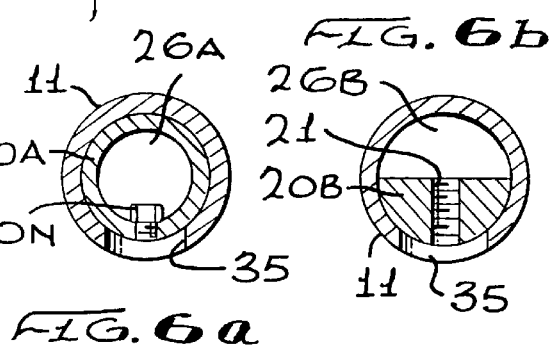

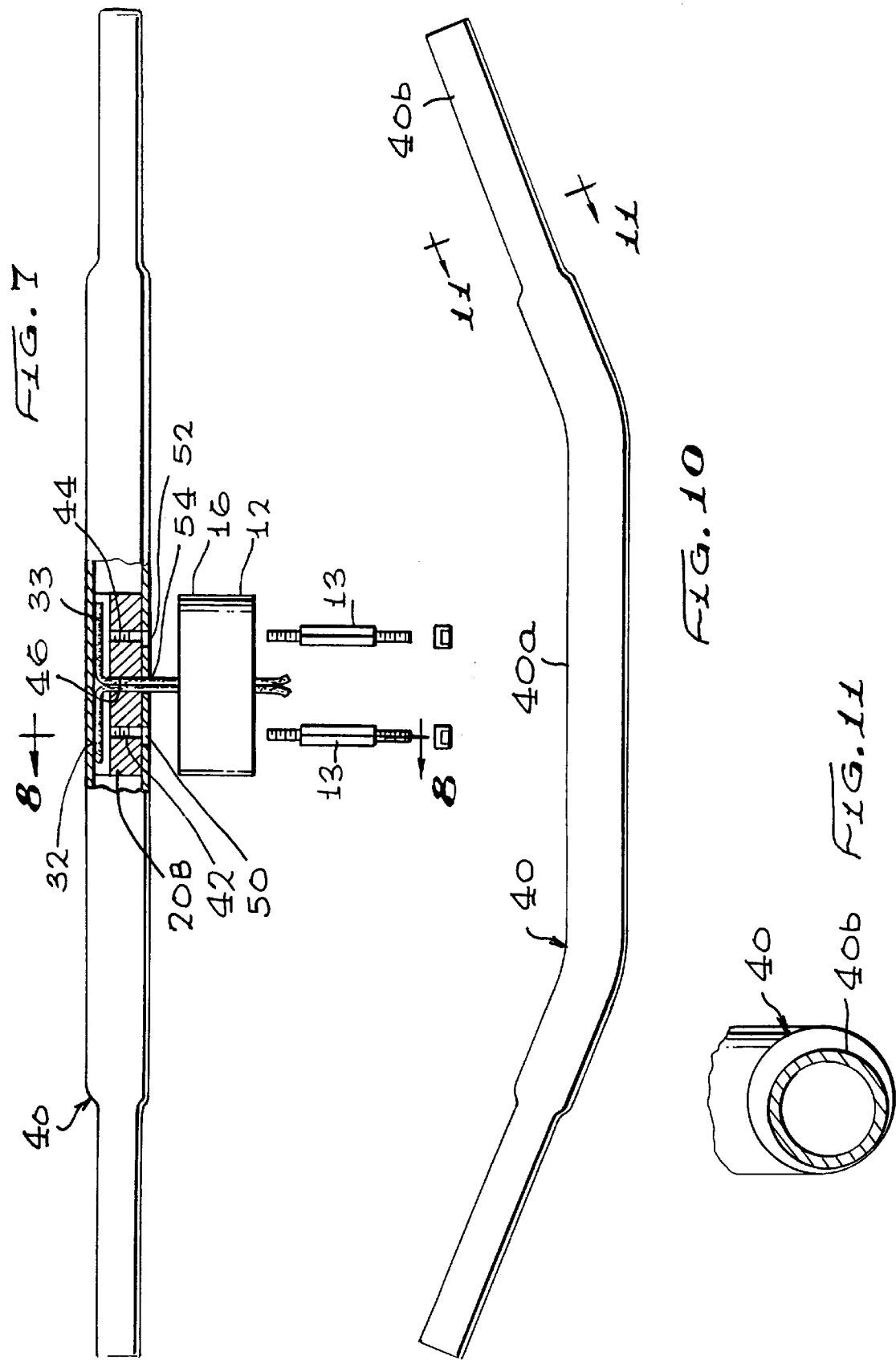

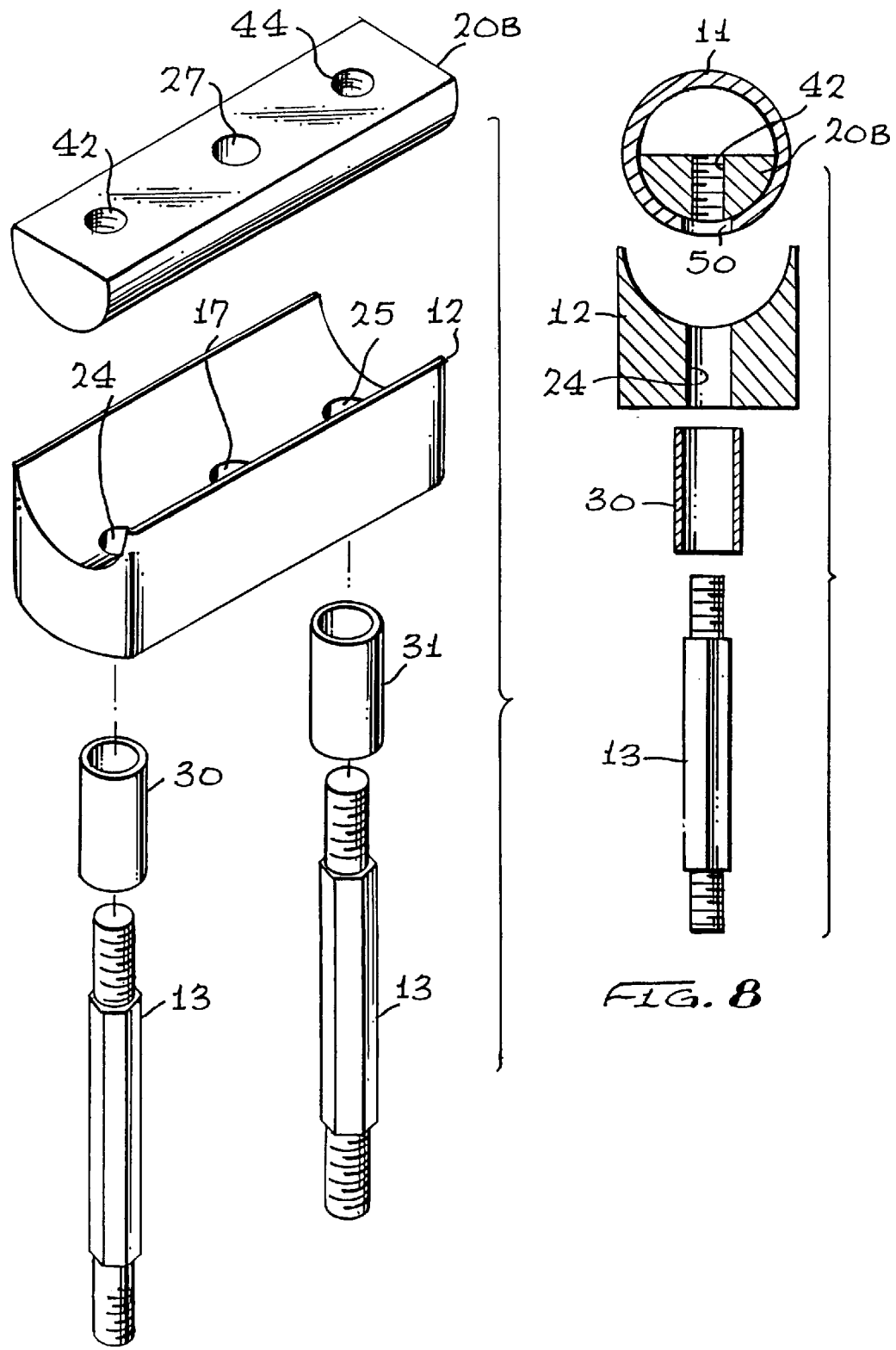

//<br>
HANDLEBAR ASSEMBLY FOR VEHICLES AND METHOD FOR MAKING THE SAME

REFERENCE TO RELATED APPLICATIONS

This is the non provisional patent application based upon provisional application Ser. No. 60/074,198 filed Feb. 10, 1998 for which priority is claimed under 35 U.S.C. 119(e).

BACKGROUND OF THE INVENTION

The motorcycle, the bicycle and some other vehicles have long been steered by a pair of handlebars with handgrips joined by a central section of the handlebar which is secured to the front fork of the vehicle. Typically, the handlebars are formed from a single tube of tubular steel, bent in a generally steerhorn or other suitable shape to provide a pair of handgrips. The central straight section is secured to the front fork assembly by a gooseneck support or other type of assembly with visible fasteners. Often the central portion of the handlebar has an enlarged section with rolled grooves to engage the gooseneck and prevent unwanted rotation in the gooseneck. Sometimes, the handlebar assembly is made up of two separate handlebars with a third piece interconnecting the handlebars. The U.S. Pat. No. 5,199,322 to Meng-liang Wu on Apr. 6, 1993 is an example of handlebars for cycles, which includes a gooseneck mount, an enlarged grooved engagement portion and two separate handlebars with an interconnection.

The gooseneck and its hardware including a bolt detracts from the appearance of the handlebar assembly and results in all of the stress on the handlebars being localized at the short interconnection with the gooseneck. This localized stress can result in a fracture of the handlebar and possible serious injury to the rider.

The handlebars also perform another function in addition to steering the cycle. The handgrip areas are almost universally used for mounting controls including electrical switches for operating lights, horns and directional signals. The manual operating controls such as throttles and brakes usually have external cables; however, the electrical switches, which usually have relatively fragile wires often have their insulated wires protected by running through the interior of the handlebar tube from the handgrip regions and must exit the handlebar somewhere near the gooseneck. At that position, movement of the wires is limited, but there remains a danger of fraying the insulation as they exit the handlebar and some movement since they usually do not exit directly on the axis of rotation of the front fork. A better arrangement for protection of electrical wires in the cycle handlebars is needed.

BRIEF DESCRIPTION OF THE INVENTION

Faced with this state of the art, I determined that it would be possible to eliminate all visible wiring on handlebars for motorcycles or other forms of handlebar steered vehicles. At the same time, I reinforced the handlebar so that the danger of bending or collapsing the handlebar is decreased. The net result is a structurally improved more attractive handlebar and also one which may actually reduce the cost of manufacture and improve the ease of installation and adjustment of the handlebar assembly. There are no high stress attachment points in the handlebar and no visible bolts, nuts, goosenecks or other attachment details. Moreover, I have improved the protection for internal wiring in the handlebars.

Each of these objectives is accomplished in a handlebar assembly which includes a formed tubing handlebar which is commonly in the classic form of a steerhorn with handle grip portions at opposite ends, compound curved sections which join at a straight central section. This central section is attached to the front fork of a handlebar steered vehicle such as a motorcycle or bicycle. The central straight section rests in a cradle or riser of both functional and ornamental design to secure the handlebar to the front wheel assembly of the motorcycle or bicycle, either directly or via other front well assembly parts to allow the handlebar to control the direction of the front wheel and thus steer the vehicle.

The cradle or riser includes one or more concealed attachment apertures through which studs or other fasteners extend from the fork or wheel assembly upward into the underside of the handlebar. Concealed within the central straight portion of the handlebar is a solid reinforcing member or locking slug, which is drilled and tapped to engage the one or more studs, which extend through the riser.

The reinforcing member may be a solid slug of metal with a longitudinal groove or hole therethrough of sufficient size to allow wires to pass which are used to connect handlebar mounted controls such as horn switches, directional signals and light control switches. A wiring hole may be located directly on the axis of rotation of the handlebars and the front fork for minimum stress on the wiring.

The reinforcing member engages the inner wall of the handlebar tube sufficiently to make the central section of the handlebar of substantial strength, in fact, the strongest section of the handlebar, rather than the weakest, as has been the case in many handlebars which include an enlarged thin wall and grooved surface to engage conventional goosenecks.

The straight central section of the handlebar is drilled at the location of the locking slug and the opening in the central section surrounding the entrance of the stud or studs for engagement with the slug is larger than the minimum size to allow the passage of the stud. This degree of clearance allows the handlebar to be pivoted, i.e., raised or lowered, about the riser and the internal slug to allow a degree of adjustment of the handlebar for the selection and comfort of the rider. The reinforcing member or locking slug is so termed because it provides both the functions of reinforcing the strength of the handlebars at their most critical location and locks the handlebars onto the front wheel assembly of the cycle to which it they are attached and at the height selected by the owner or rider.

Angle adjustment, i.e., height adjustment of the grip or handle portions of the handlebar is accomplished simply by loosening the stud or studs to loosen the engagement between the inner wall of the handlebar and the outer wall of the stud, pivoting the handlebars up or down and tightening the stud or studs. This adjustment is performed from the under side of the handlebar without any contact with the ornamental surfaces of either the handlebar or the riser so there is no danger of damage to the finish of either part or to internal wiring.

This novel design of handlebar and its features are all available owing to the process by which the handlebar assembly is made. Specifically, the handlebar tube blank is cut to length; access holes are drilled in what is to be the underside of the handlebar central section. Before any forming of the handlebar proceeds, the fabricated slug or reinforcing member is inserted into the tube and located at its central location. After that step, the succeeding steps of formation of the handlebar may be carried out, such as roll forming reduced diameter hand grip sections, forming the steerhorn or other desired shape to the handlebar and finishing such as chrome plating is carried out. The reinforcing slug is secured within the handlebar for all time once the forming steps are completed.

The riser with its recess or cradle is formed by any of several conventional metal working methods, drilled for receiving the stud or studs and finished as by plating to match the handlebar or the cycle. The stud or studs are inserted through the riser, through the opening in the wall of the handlebar and engages the threaded opening in the slug or reinforcing element. When a stud is attached to the yoke or other part of the yoke assembly and tightened, the handlebar and slug become a unitary rigid assembly.

The riser may rest directly on a plate or other part of the front wheel yoke assembly or may be raised by spacers, which enclose the stud or studs. In either case, the handlebar is secured to the riser and to the front wheel yoke of the motorcycle or other vehicle. The tubular spacers cover any exposed portion of the studs. Preferably, the studs used have sections which may be engaged by a wrench to loosen the engagement with the slug with the stud to allow for raising or lowering angular adjustment of the height of the handgrips of the handlebar followed by tightening of the studs to lock the handlebar grips at their desired height.

BRIEF DESCRIPTION OF THE DRAWINGS

This invention may be more clearly understood from the following description and by reference to the drawing in which:

FIG. 1 is a front elevational view of a finished handlebar assembly for motorcycles or the like;

FIG. 2 is a rear elevational view of the handlebar of this invention, partly broken away and partly exploded to show the internal attachment feature;

FIG. 3 is a bottom plan view of the attachment portion of the handlebar of this invention;

FIG. 3A is a vertical sectional view of the attachment portion of the handlebar of FIG. 1 taken along line 3A—3A of FIG. 1; showing the degree of angular or height adjustment of the handlebars of this invention;

FIG. 4 is an exploded perspective view of the attachment feature of this invention to allow the handlebar to be attached to dual post-front wheel assemblies;

FIG. 5 is an exploded side elevational sectional view taken and exploded along line 5—5 of FIG. 2;

FIGS. 6(a) and (b) are vertical sectional views of two alternate forms of central reinforced slugs for use in this invention; and FIG. 7 is an exploded front view, partly in section, of an alternate embodiment of handlebar of this invention;

FIG. 8 is an exploded sectional view taken along line 8—8 of FIG. 7;

FIG. 9 is an exploded perspective view of the attachment feature of the embodiment of FIG. 7;

FIG. 10 is a top plan view of the handlebar assembly of FIG. 7.

FIG. 11 is a sectional view, partly broken away, along line 11—11 of FIG. 10.

DETAILED DESCRIPTION OF THIS INVENTION

Figure 12:
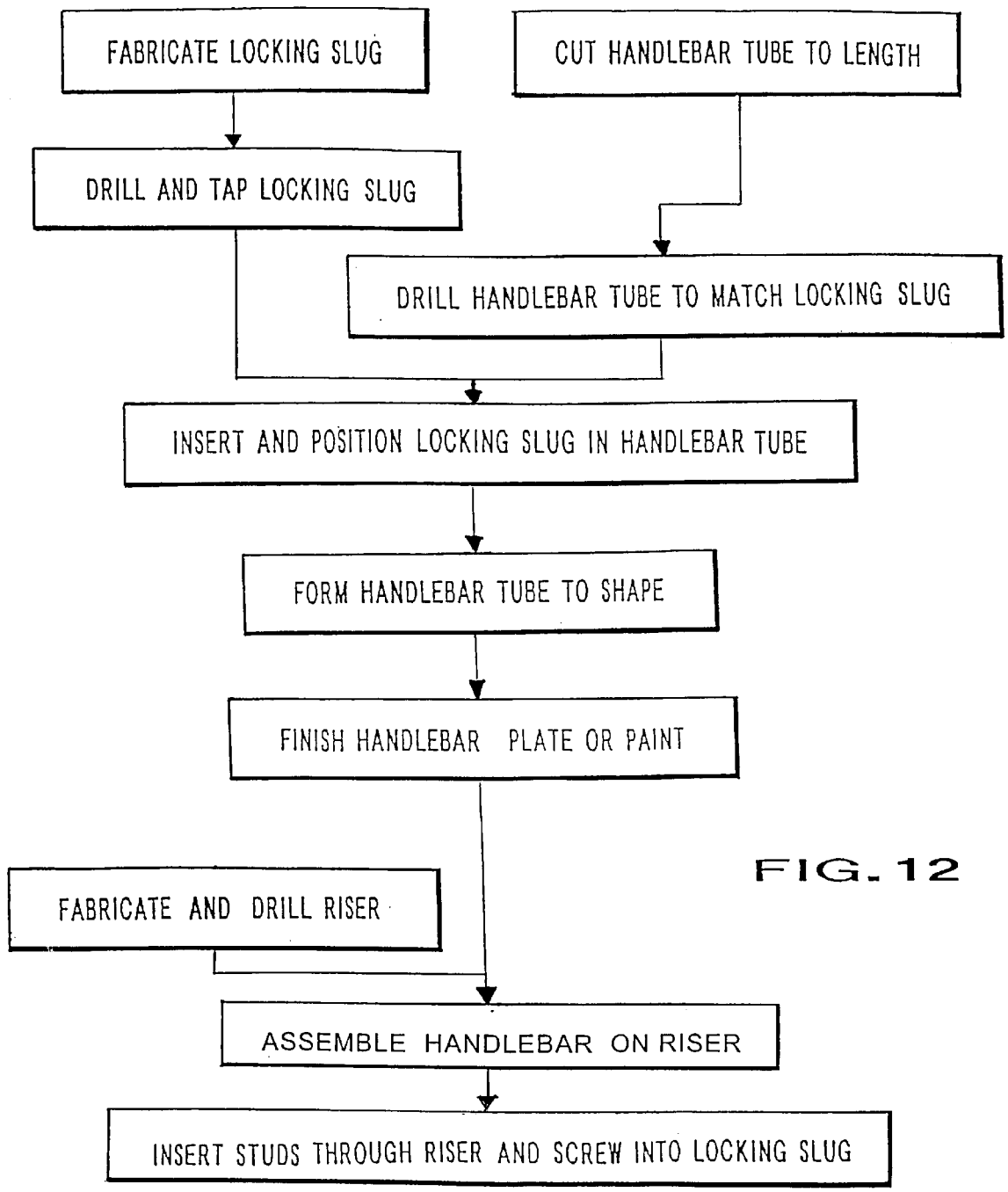
FIG. 12 is a flow diagram for the process of making a handlebar of this invention.

This invention involves a new form of handlebar, generally designated 10 and its mounting structure for use on motorcycles, bicycles and other forms of handlebar steered vehicles. The handle bar 10 is formed from the single length of steel tubing 11 mounted on a cradle or riser and secured to the vehicle (unshown) by studs 13. The tubing 11 may have handgrip portions 14 which have been necked down as shown in the drawing FIGS. 1 and 2 to receive handlebar grips and hand controls, not shown in the drawing, but well known in the art.

In FIGS. 1 and 2, the handlebar 10 is shown of the conventional steerhorn shape but virtually any other shape may use this invention owing to the novel method and attachment features described below.

The handle bar tube 11 includes a central straight section 15, which rests in, and is secured to a riser 12 having a longitudinal recess 16 in its upper surface, as best seen in FIG. 4, the recess 16 having an inside curvature which corresponds to the outside diameter of the tube 11. The central straight portion 15 of the handlebar 10 rests in the recess 16 of the riser 12 and engages a major length of the central portion 15 to spread the operating load on the handlebar 10 over a broad area as that load is transferred to or from the front wheel of the vehicle to thereby reduce the local stress on the handlebar 10.

The handle bar 10 appears to be merely resting in the recess 16 without any visible attachment. However, as may be seen in the broken away portion of FIG. 2 and in FIGS. 3, 3A and 4 the handlebar tube 11 encloses an internal reinforcing and securing slug 20 which is preferably in slip fit relationship with the interior wall of the tubular member 11. The slug 20 also includes a wiring groove 26 on its upper surface and a pair of threaded downwardly extending openings 21 and 22 of FIG. 2 which receive a pair of studs 13 or other fasteners. These studs 13 extend through the riser 12 which has bores 24 and 25 matching openings 21 and 22 to allow the studs 13 to be threaded into the slug 20 at the upper end to secure the handlebar 10 and at the lower end of the studs 13 to threadably engage the fork or other mount for the front wheel of a handle bar steered vehicle.

The slug 20, riser 12 and studs 13, as well as optional spacers 30 and 31 may be seen most clearly in FIG. 4 without the handlebar tube 11. The slug 20 is preferably a solid steel member, which can be slipped into the tube length to be used for the handlebar 10 after cutting to length and before any bending or forming is conducted on the handlebar tube 11. The upper side of slug 20 includes the longitudinal extending wire groove 26 to accommodate the necessary wires for hand operated light switches, directional signals and the like. The slug 20 and riser 12, as well as the handlebar tube 11 may optionally include mating openings 17 and 27, respectively, and to allow wires 32, 33 from the interior of the handlebar tube 11 to emerge downward from the handlebar assembly 10 to connect to their appropriate power supplies and controlled electrical devices. This is illustrated in FIGS. 2 in which cables 32 and 33 may be seen lying in the wiring groove 26 of the slug 20 and passing through wiring openings 27 and 17 of FIG. 4.

From the standpoint of the observer, the handlebar as seen in FIG. 1 shows no visible handlebar connection devices such as goosenecks, studs, bolts and the like. The handlebar assembly presents an attractive view for both the rider viewing the assembly from the rear or observers viewing the assembly from the front or side.

The slug 20 extends within the central straight length 15 of the handlebar 10, at least as long as the riser 12 and, in fact, can extend for the full straight length 15 of the handlebar tube 11 after it has been bent to its final shape.

This slug 20 provides substantial reinforcement to the tube 11 strengthening the handlebar 10 without in anyway detracting from its appearance.

It is apparent from FIGS. 1 and 2 that the slug 20 cannot be inserted in the tube 11 after formation and surface treating such as plating. The method of fabrication and assembly of this invention is described below in connection with FIG. 12.

In FIG. 3 the slug 20 is shown extending well beyond the points of attachment to the handlebar 11 that are visible at the under side of the handlebar tube 11. The threaded openings 21 and 22 in the slug 20 may be seen surrounded by the larger openings 35 and 36 of the tubular handlebar 11. This size relationship between the threaded openings 21 and 22 in the slug 20 and the larger openings 35 and 36 in the handlebar 11 allows the handlebar 11 to be adjusted angularly by the full amount of the differences in diameters (FIG. 3A). For example, where the openings 20 and 21 and their studs 13 are 7/16 in. in diameter and the openings 35 and 36 are 7/8 in. in diameter, there is freedom of adjustment of 7/16 in. adjustment of the position of the handlebar 11 available. This translates into approximately 30 to 36 degrees of angular adjustment of the position of the handlebar 10. This amount of adjustability is believed to be more than adequate for most riders. Alternatively, slots 7/16 in. wide and of a length to provide the desired angular adjustment such as 7/8 in. to 1 in. could replace openings 35 and 36. The adjustment features of the openings 35 and 36 and the studs 13 remain concealed with the riser 12 at all angles of adjustment.

It is possible to obtain certain of the advantages of this invention employing different forms of this slug 20. Two such alternate forms appear in FIGS. 6(a) and (b). In FIG. 6(a), a section of tubing 20A with a captured nut or internally threaded insert 20N is used to engage the stud 13. The tubing may well be less expensive than a machined part such as slug 20 even with the requirement that it be threaded or fitted with a captured nut or captured threaded insert. Similarly, a half round slug 20B with threaded bores 21, as shown in FIG. 6(b), may be used. Both the forms 20A and 20B inherently provide a wiring passage 26A or 26B and provide reinforcement for the handlebar tube 11.

FIG. 7 is an exploded front elevational view, partly in section, of an alternate embodiment of the present invention. In comparison with the handlebar of FIGS. 1 and 2 it will be apparent that as seen from the front, this handlebar 40 does not have the vertical riser sections as shown in FIGS. 1 and 2, but appears to extend altogether horizontally. The reinforcing member carried within the handlebar 40 is that shown at 20B of FIG. 6 which is in the form of a half cylinder having drilled and tapped bores 42 and 44 plus an additional bore 46 to receive electrical wires 32 and 33. Handlebar 40 is carried in riser member 12 as described above and is drilled to provide ports 50 and 52 which are larger than bores 42 and 44 as discussed above, and a bore 54 aligned with bore 46. Studs 13 pass through ports 24 and 25 in riser 12 which are spaced the same as bores 42 and 44 of reinforcing member 20B, through ports 50 and 52 and are screwed into threaded bores 42 and 44 to secure the assembly together. Handlebar 40 and riser 12 may have additional ports or bores in addition to bores 46 and 54 to receive more wires or control cables.

FIG. 8 is a sectional view taken along line 8—8 of FIG. 7 and is similar to FIG. 5 except for the different reinforcing member 20B. Here it will be apparent that bore 50 in handlebar 40 is larger than stud 13 so that by loosening stud 13, handlebar 40 may be given an angular adjustment as described above.

FIG. 9 is similar to FIG. 4 showing reinforcing member 20B spaced away form longitudinal recess 16 of riser 12. Since member 20B is a half cylinder, it leaves substantial room between itself and the inside of handlebar 40 to run wires or cables. Member 20B could even be somewhat less than a complete half cylinder in cross section but must provide substantial volume to accommodate bores 42, 44 and 27 and enough contact area with the inside of handlebar 40 to provide adequate reinforcement. Studs 13 pass through riser member 12, ports 52 and 54 in handlebar 40 (not shown in FIG. 9) and are screwed into ports 42 and 44 as described above.

FIG. 10 is a top plan view of the handlebar 40. In this view only handlebar 40 is visible, with riser member 12 completely hidden behind handlebar 40. In this view is shown the angle to which the outside ends of the handlebars are bent. The center section 40a is of larger diameter than the handgrip portions 40b. The handgrip portions 40b are formed (swaged) to a smaller diameter and for one application somewhat off concentric with the center section 40a as also shown in FIG. 11. This is to allow a handlebar mounted component to fit snugly against the handlegrip portion. Obviously, the handgrip sections may also be of reduced diameter from the center section and concentric therewith.

The procedure for producing either embodiment of this improved handlebar assembly is set forth in FIG. 12. First the handlebar tube 11 or 40 is cut to the desired length. The slug 20 or 20B is then fabricated and inserted into the tube 11 or 40 prior to any bending steps. Upon the forming, i.e. bending of the tubular member 11, the slug is captured within the handlebar 11 and provides an improved low stress attractive handlebar mount. The handlebar is then finished, as by chrome plating or other desired finishing process. This provides a reinforced handlebar, and one which can be attached from the bottom of the tube 11 or 40 alone without any gooseneck. Also, in accordance with the process of FIG. 12, all fasteners for the handlebars are concealed from view from above.

The above-described embodiments of the present invention are merely descriptive of its principles and are not to be considered limiting. It is recognized that one of ordinary skill in the art of motorcycle handlebar design, might, after reviewing this invention, and its various aspects, envision other variations which do not depart from the spirit and substance of this invention. The scope of this invention is to be judged, instead, by the scope of the following claims.

I claim:

1. A handlebar assembly comprising a hollow handlebar member having a straight center section including a plurality of radially directed bores;

a reinforcing member within said center section having a cross-section substantially fitting within at least a major part of said center section and including threaded bores aligned with at least some of said radially directed bores;

a riser member having a longitudinal groove for receiving said center section including a plurality of bores aligned with the bores of said center section, said center section bores being larger than the bores in said reinforcing member and said riser member; and fastening means securing said riser member, said center section and said reinforcing member together including members threadedly engaged with said threaded bores.

2. A handlebar assembly as claimed in claim 1 wherein said fastening means further includes means securing said handlebar assembly to said vehicle.

3. A handlebar assembly as claimed in claim 1 wherein said handlebar member is tubular, said reinforcing member constitutes a tubular member, the bores in said tubular member include threads and said fastening means includes members threadedly engaged with said threaded bores.

4. A handlebar assembly as claimed in claim 1 wherein said reinforcing member is generally cylindrical and includes a longitudinal passage communicating with one of said bores in said reinforcing member.

5. A handlebar assembly as claimed in claim 1 wherein said reinforcing member is generally semi-cylindrical leaving an elongated space within said center section communicating with one of said bores in said reinforcing member.

6. A handlebar assembly as claimed in claim 1 wherein said hollow handlebar member is tubular and includes outboard sections bent out of alignment with said center section, and outboard handgrip sections of reduced diameter formed non-concentric with said outboard sections.

7. A handlebar assembly as claimed in claim 5 wherein said reinforcing member includes threaded bores and said fastening means includes members threadedly engaged with said threaded bores.

8. A handlebar assembly as claimed in claim 5 wherein the bores in said straight center section are larger than the bores in said reinforcing member and said riser member.

9. A handlebar assembly for a vehicle comprising;
   a tubular handlebar member having a straight center section, said center section having a plurality of radial bores;
   a reinforcing member within said straight center section including a plurality of bores aligned with said center section bores at least some of said bores being threaded, said reinforcing member being generally semi-cylindrical leaving an elongated space within said center section communicating with one of said bores in said reinforcing member:
   a riser member having a longitudinal groove for receiving said straight center section and a plurality of bores aligned with the bores of said straight center section and said reinforcing member;
   fastening members passing through a plurality of said bores and threadedly engaged with said threaded bores for securing said reinforcing member, said straight center section and said riser member together; and
   wherein the bores in said center section are larger than the bores in said reinforcing member and said riser member.

10. A handlebar assembly as claimed in claim 9 wherein said hollow handlebar member is tubular and includes outboard sections bent out of alignment with said center section, and outboard handgrip sections of reduced diameter formed nonconcentric with said outboard sections.

11. A method of producing a handlebar assembly comprising the steps of:

1) cutting a handlebar tube to length,
2) fabricating a reinforcing member to fit within said handlebar tube including drilling and tapping a plurality of radially directed bores,
3) drilling said handlebar tube to provide ports in registry with the bores in said reinforcing member,
4) inserting said reinforcing member in the handlebar tube and securing said member in position,
5) forming said handlebar tube to the desired shape,
6) fabricating and drilling a riser member with bores in registry with bores in said reinforcing member,
7) finishing the formed handlebar and riser members,
8) assembling said handlebar on said riser member, and
9) providing a plurality of studs, inserting studs through said riser member and said handlebar and screwing said studs into said reinforcing member.

12. A method of producing a handlebar assembly as claimed in claim 11 wherein said ports in said handlebar tube are formed significantly larger than the bores in said reinforcing member.

13. A method as claimed in claim 11 wherein said reinforcing member is a generally cylindrical metal slug.

14. A method as claimed in claim 11 wherein a longitudinal groove is formed in said reinforcing member.

15. A method as claimed in claim 11 wherein said reinforcing member is a generally semi-cylindrical metal slug.

16. A method as claimed in claim 11 wherein said reinforcing member is a hollow cylindrical member.

17. A handlebar assembly comprising a hollow handlebar member having a straight center section including a plurality of radially directed bores;
   a reinforcing member within said center section having a cross section substantially fitting within at least a major part of said center section and including threaded bores aligned with at least some of the bores of said center section, said reinforcing member including an elongated space within said center section communicating with one of the bores in said reinforcing member;
   a riser member having a longitudinal groove for receiving said center section and a plurality of bores aligned with the bores of said center section; and
   fastening means securing said center section, said riser member and said reinforcing member together including members passing through the bores of said riser member and threadedly engaged with said threaded bores.

18. A handlebar assembly as claimed in claim 17 wherein said reinforcing member constitutes a tubular member.

19. A handlebar assembly as claimed in claim 17 wherein said reinforcing member is generally cylindrical.

* * * * *